(12) United States Patent
Akiyama et al.

(10) Patent No.: US 9,448,541 B2
(45) Date of Patent: Sep. 20, 2016

(54) ELECTRONIC TIMEPIECE

(71) Applicant: Seiko Epson Corporation, Tokyo (JP)

(72) Inventors: Toshikazu Akiyama, Matsumoto (JP); Katsuyuki Honda, Miyada-mura (JP); Norimitsu Baba, Shiojiri (JP); Jun Matsuzaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/712,688

(22) Filed: May 14, 2015

(65) Prior Publication Data

US 2015/0316897 A1 Nov. 5, 2015

Related U.S. Application Data

(63) Continuation of application No. 13/597,892, filed on Aug. 29, 2012, now Pat. No. 9,063,523.

(30) Foreign Application Priority Data

Aug. 30, 2011 (JP) ................. 2011-187861

(51) Int. Cl.
| | |
|---|---|
| *G04R 20/00* | (2013.01) |
| *G04R 20/02* | (2013.01) |
| *G04R 20/04* | (2013.01) |
| *G04R 60/14* | (2013.01) |
| *G01S 19/28* | (2010.01) |
| *H04B 7/185* | (2006.01) |

(52) U.S. Cl.
CPC ............. *G04R 20/02* (2013.01); *G04R 20/00* (2013.01); *G04R 20/04* (2013.01); *G04R 60/14* (2013.01); *G01S 19/28* (2013.01); *H04B 7/185* (2013.01)

(58) Field of Classification Search
CPC ....... G04R 20/00; G04R 20/02; G04R 20/04
USPC ....................... 368/47; 342/357.67
See application file for complete search history.

(56) References Cited

U.S. PATENT DOCUMENTS

| | | | | |
|---|---|---|---|---|
| 5,924,015 | A * | 7/1999 | Garrison | ............ H04B 7/18543 455/13.4 |
| 5,952,968 | A * | 9/1999 | McDowell | .............. G01S 19/21 342/357.59 |
| 6,240,366 | B1 | 5/2001 | Nagatsuma et al. | |
| 8,694,248 | B1 * | 4/2014 | Arbuckle | ................ G01S 19/23 398/26 |
| 2002/0068536 | A1 | 6/2002 | Davis et al. | |

(Continued)

FOREIGN PATENT DOCUMENTS

| | | |
|---|---|---|
| GB | 2463703 A | 3/2010 |
| JP | 2009-180555 A | 8/2009 |
| JP | 2009-282072 A | 12/2009 |

*Primary Examiner* — Amy Cohen Johnson
*Assistant Examiner* — Daniel Wicklund

(57) ABSTRACT

An electronic timepiece can determine the reception state in detail, and can display the reception state with high precision. A GPS wristwatch 1 has a reception unit that receives a satellite signal transmitted from a positioning information satellite; a reception level calculating unit 47 that calculates a reception level from the signal strength of the satellite signal; and a reception level display unit 48 that displays the reception level calculated by the reception level calculating unit 47. The reception level calculating unit 47 selects a specific number of satellite signals received from the positioning information satellites in order of greatest signal strength, and calculates the reception level from the signal strengths of the selected satellite signals.

11 Claims, 6 Drawing Sheets

(56) References Cited

U.S. PATENT DOCUMENTS

| | | |
|---|---|---|
| 2005/0020210 A1 | 1/2005 | Krumm et al. |
| 2006/0114151 A1 | 6/2006 | Iwami |
| 2008/0171510 A1 | 7/2008 | Aizawa |
| 2009/0016171 A1 | 1/2009 | Fujisawa |
| 2009/0140919 A1 | 6/2009 | Shingyoji |
| 2009/0189809 A1 | 7/2009 | Baba |
| 2011/0044137 A1 | 2/2011 | Matsuzaki |
| 2011/0051561 A1* | 3/2011 | Fujisawa ............... G04G 5/002 368/47 |
| 2011/0255571 A1 | 10/2011 | Caffrey et al. |

* cited by examiner

RECEPTION MODE
(TIMEKEEPING)

RECEPTION MODE
(POSITIONING)

RECEPTION LEVEL ≤ 30

RECEPTION LEVEL = 43

RECEPTION LEVEL = 39

RECEPTION LEVEL ≥ 50

ELECTRONIC TIMEPIECE

CONTINUING APPLICATION DATA

This application is a continuation of, and claims priority under 35 U.S.C. §120 on, application Ser. No. 13/597,892, filed on Aug. 29, 2012, which claims priority under 35 U.S.C. §119 on Japanese patent application no. 2011-187861, filed on Aug. 30, 2011. The content of each application identified above is incorporated by reference herein in its entirety.

BACKGROUND

1. Technical Field

The present invention relates to an electronic timepiece that receives and obtains the current date and time from satellite signals transmitted from positioning information satellites such as GPS satellites.

2. Related Art

Electronic timepieces that receive and acquire the current date and time from satellite signals transmitted from positioning information satellites such as GPS (global positioning system) satellites, and display the reception level are known from the literature. See, for example, Japanese Unexamined Patent Appl. Pub. JP-A-2009-180555.

The electronic timepiece described in JP-A-2009-180555 displays the reception level in three levels, 0, 1, 2. When in the timekeeping mode and the number of GPS satellites that are locked onto is 0, the reception level is 0; when one or more GPS satellites are found but do not include a GPS satellite with an SNR equal to or greater than a specific level, the reception level is 1; and when signals are received from one or more GPS satellites with an SNR equal to or greater than the specific level, the reception level is 2.

In the positioning mode that acquires positioning information, the reception level is 0 if 3 or less GPS satellites are locked onto; the reception level is 1 if the number of GPS satellites locked onto is at least 4 and the number of GPS satellites with an SNR equal to or greater than the specific level is 3 or less; and the reception level is 2 if the electronic timepiece locks onto four or more GPS satellites with an SNR equal to or greater than the specific level.

Even users without a sufficient understanding of how the GPS system works can thus easily determine the reception state because the reception level is displayed in three levels.

Determining the reception state more precisely is difficult, however, because the reception level is displayed in only three levels. For example, when the reception level is 0 in the positioning mode, determining whether three GPS satellites were locked onto, or whether reception is simply not possible in the current location, is not possible.

In addition, when three satellites have been locked onto, the possibility of locking onto a fourth is high, and reception is therefore preferably continued. On the other hand, because the possibility of being able to acquire information is low even if reception continues when even one satellite cannot be received, reception is preferably terminated promptly to reduce power consumption. Because the action to be taken thus preferably differs according to the conditions when the reception level is 0, the ability to know the reception state in greater detail is desirable.

SUMMARY

An electronic timepiece according to the invention can determine the reception state accurately, and can display the reception state with great precision.

An electronic timepiece according to the invention has a reception unit that receives a satellite signal transmitted from a positioning information satellite; a reception level calculating unit that calculates a reception level from the signal strength of the satellite signal; and a reception level display unit that displays the reception level calculated by the reception level calculating unit. The reception level calculating unit selects a specific number of satellite signals received from the positioning information satellites in order of greatest signal strength, and calculates the reception level from the signal strengths of the selected satellite signals.

The reception level calculating unit in this aspect of the invention selects a specific number of satellite signals in order of the highest signal strength, and calculates the reception level from the signal strengths of the selected satellite signals. Because the number of satellite signals used to calculate the reception level is set by this specific number, the reception state required to acquire the necessary information in the timekeeping mode and positioning mode can be displayed appropriately.

For example, in the timekeeping mode that acquires time information from the satellite signal, the specific number is set to 1, the satellite signal with the highest signal strength is selected, and the reception level is calculated from the strength of that signal. In the positioning mode that acquires positioning information from the satellite signals, the specific number is set to 4, the satellite signals with the four highest signal strengths are selected, and the reception level is calculated by obtaining the average signal strength of those signals.

As a result, because the signal strength of the satellite signal with the highest signal strength is displayed as the reception level, the reception state can be displayed with greater precision than when the level is displayed in two levels of 1 and 2 based on whether a threshold value is exceeded or not as in JP-A-2009-180555.

Likewise, because the reception level can be displayed in the positioning mode by obtaining the average signal strength of the four satellite signals with the highest signal strength, a different reception level can be displayed when not even one satellite signal can be received and when three are received. The user of the electronic timepiece can therefore more accurately know the reception state.

In an electronic timepiece according to another aspect of the invention, the reception level calculating unit calculates the sum of the signal strengths of the specific number of selected satellite signals divided by the specific number as the reception level.

The reception level calculating unit in this aspect of the invention calculates the sum of the selected specific number of signal strength values divided by the specific number, that is, the average of the specific number signal strength values, as the reception level.

For example, when four satellite signals are selected as the specific number in order of the highest signal strength in the positioning mode, and the signal strengths of those signals are 43, 42, 41, 40, the average of these signal strength values is (43+42+41+40)/4=41.5, which is rounded to 42. However, if in descending order the signal strength values are 45, 45, 45, 0, that is, only three satellite signals are received, the average signal strength is (45+45+45+0)/4=33.75 or approximately 34. However, if in descending order the signal strength values are 36, 36, 35, 35, the average signal strength is (36+36+35+35)/4=35.5 or approximately 36. Further, if in descending order the signal strength values are 0, 0, 0, 0, that is, not even one satellite signal can be received, the average signal strength is 0.

Therefore, when in the positioning mode that requires receiving four satellite signals and the signal strength of all four signals is high at 40 or more, the reception level will also be high at 40 or more, and by displaying that value the user can easily know that the reception environment is good.

However, if only three satellite signals with a high signal strength of 40 or more can be received, the reception level is in the range of 30-35. In this case, JP-A-2009-180555 displays the same reception level, level 0, as when not even one signal is received, and the user cannot know the reception state more accurately.

The invention, however, enables clearly differentiating between when three satellite signals are received and when not even one signal is received, and the user can more accurately know the reception state.

An electronic timepiece according to another aspect of the invention can select a timekeeping mode that receives the satellite signal and performs a time adjustment process, and a positioning mode that adjusts the time difference of the time based on positioning information acquired by receiving satellite signals; and the specific number selected by the reception level calculating unit changes according to the selected mode.

To acquire positioning information for the current location correctly in the positioning mode, satellite signals must be received from four positioning information satellites. The specific number selected by the reception level display unit is therefore also set to 4.

However, because acquiring a satellite signal from one positioning information satellite is sufficient in the timekeeping mode, the specific number selected by the reception level display unit is set to 1.

The reception level can thus be displayed appropriately to the selected mode by changing the specific number of satellite signals selected according to whether the timekeeping or positioning reception mode is selected.

In an electronic timepiece according to another aspect of the invention, when the number of satellite signals received is greater than or equal to 1 and less than the specific number, the reception level calculating unit sets the signal strength of the number of satellite signals less than the specific number to a preset provisional signal strength to calculate the reception level.

The provisional signal strength is set considering the likelihood of being able to receive a satellite signal that has not actually been received if reception continues. For example, if the probability of being able to receive a satellite signal with a signal strength of approximately 40 is 50%, the provisional signal strength could be set to 40×50%=20, for example. The provisional signal strength could also be set according to the number missing. For example, the provisional signal strength is 20 if the number of signals missing is 1, 16 if the number missing is 2, and 12 if the number missing is 3. Because the probability of successful reception decreases as the number missing increases, lowering the provisional signal strength more closely reflects the actual condition.

By setting the signal strength of the number of satellite signals less than the specific number to the provisional signal strength to calculate the reception level, the invention enables calculating a reception level better suited to the probability of reception than when the reception level is calculated using a signal strength of 0 for satellite signals not received.

In an electronic timepiece according to another aspect of the invention, the reception level calculating unit lowers the provisional signal strength used to calculate the reception level when the time passed from when reception starts becomes long.

The probability that the unreceived number of satellite signals can be received decreases as the time since the start of reception increases. As a result, by decreasing the provisional signal strength as this time increases, the invention enables calculating a reception level better suited to the actual probability of reception.

In an electronic timepiece according to another aspect of the invention, the reception level calculating unit applies correction that increases the signal strength a specific percentage when the signal strength of the received satellite signal is greater than or equal to a first threshold value, uses without changing the signal strength when the signal strength of the received satellite signal is less than a first threshold value and greater than or equal to a second threshold value that is less than the first threshold value, applies correction that decreases the signal strength a specific percentage when the signal strength of the received satellite signal is less than the second threshold value, and calculates the reception level using the corrected signal strength.

This aspect of the invention can correct the reception level to a higher value when the signal strength is greater than a first threshold value, and can correct the reception level to a lower value when the signal strength is less than a second threshold value. As a result, the reception level is emphasized and displayed with an even higher value when the possibility of acquiring information is high, and an even lower value when the possibility is low, and whether or not information can be received can be displayed so that it is easily understood by the user.

An electronic timepiece according to another aspect of the invention preferably also has hands that display time, and the reception level display unit uses a hand to display the reception level.

This aspect of the invention uses a hand for indicating the time to display the reception level, and therefore does not need a special mechanism or display to display the reception level. The parts count and cost of the electronic timepiece can therefore be reduced, and the design of the electronic timepiece can be simplified to improve the aesthetic appeal.

An electronic timepiece according to another aspect of the invention preferably also has a second hand that indicates the second, and the reception level display unit uses the second hand to display the reception level.

By using the second hand to display the reception level, this aspect of the invention can indicate the reception level in real time. More specifically, because the second hand moves in 1-second steps, the reception level can be easily displayed in 1-second increments. In addition, because the second hand is thinner and lighter than the hour hand and minute hand, bidirectional movement can be easily controlled according to changes in the reception level, and the reception level can be displayed with good response.

DESCRIPTION OF EMBODIMENTS

Embodiment 1

A first preferred embodiment of the invention is described below with reference to the accompanying figures.

Structure of an Electronic Timepiece

Figure 1:
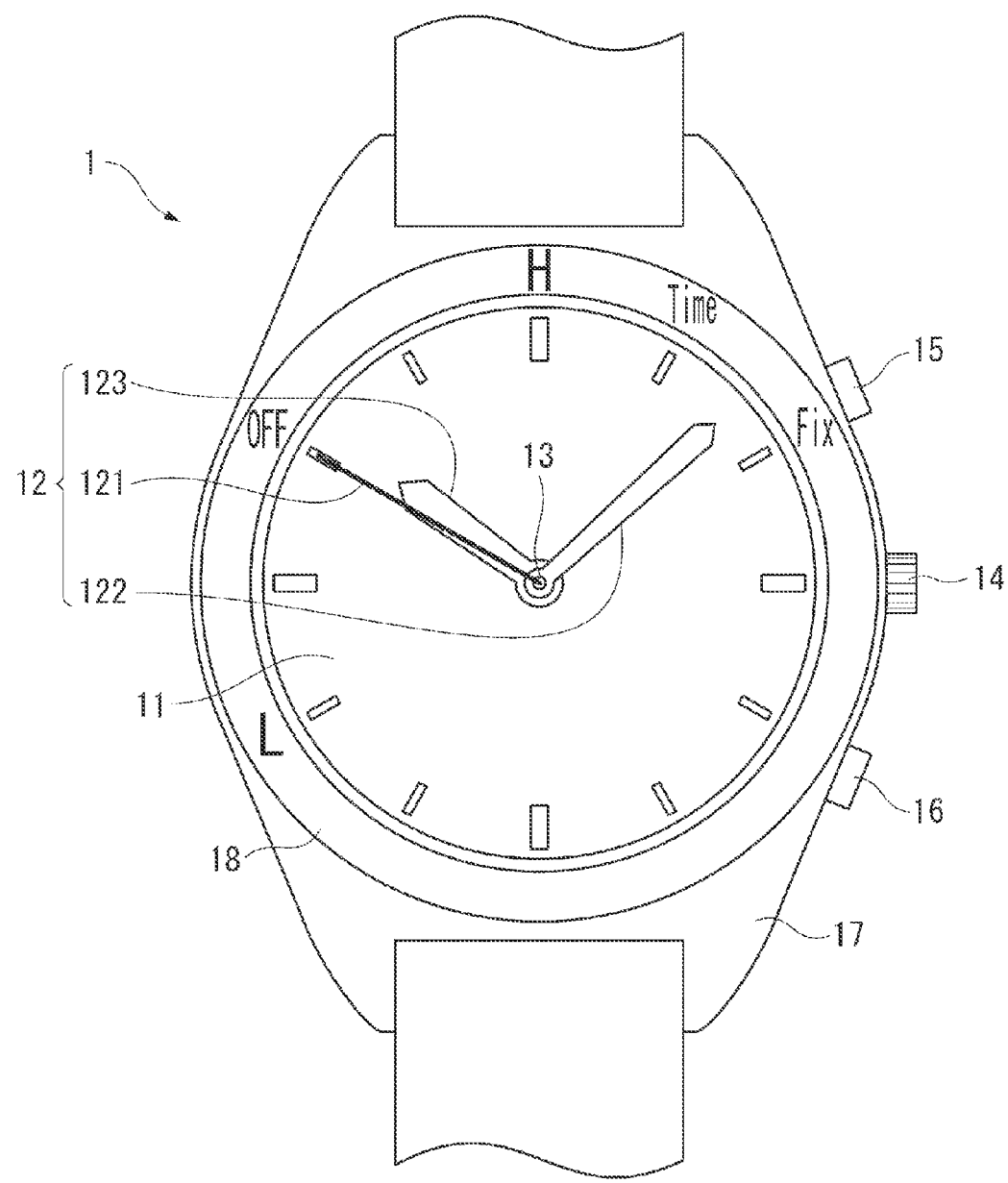
FIG. 1 is a plan view of a GPS wristwatch as an example of an electronic timepiece according to the invention.

As shown in FIG. 1, a GPS wristwatch 1 described below as an example of an electronic timepiece according to a first embodiment of the invention is a wristwatch that has a dial 11 and hands 12, and keeps and displays time.

Most of the dial 11 is made from a non-metallic material (such as plastic or glass) through which light and microwaves in the 1.5 GHz band can pass easily.

The hands 12 are disposed on the face side of the dial 11. The hands 12 include a second hand 121, minute hand 122, and hour hand 123 that rotate on a center shaft 13, and are driven by a stepper motor through an intervening wheel train.

The GPS wristwatch 1 executes specific processes when the crown 14, button 15, and button 16 are manually operated. More specifically, when the crown 14 is operated, a manual adjustment process that corrects the displayed time according to how the crown 14 is operated is performed.

When button 16 is pressed, a switching process changes the reception mode sequentially between a timekeeping mode, a positioning mode, and an automatic reception OFF mode each time the button is pressed.

Figure 6A:
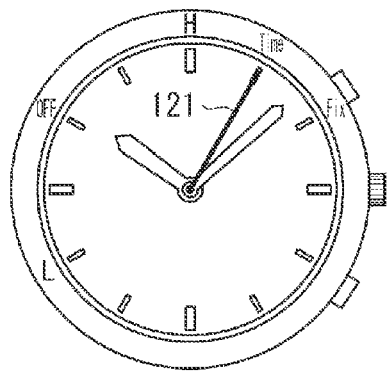
FIGS. 6A, 6B, 6C, 6D, 6E, and 6F show examples of displaying the reception level in the first embodiment of the invention.
Figure 6B:
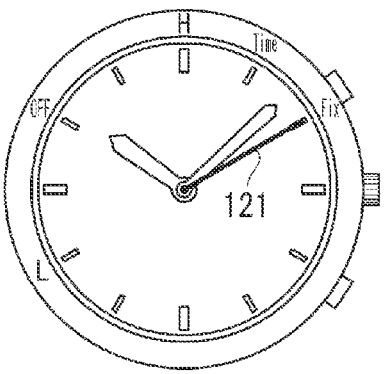

When the automatic reception OFF mode is set, the second hand 121 jumps to the OFF position (50-second position) as shown in FIG. 1. When the timekeeping mode is set, the second hand 121 moves to the Time position (5-second position) as shown in FIG. 6A, and when the positioning mode is set, the second hand 121 moves to the Fix position (10-second position) as shown in FIG. 6B. As a result, the user can easily know which reception mode is set.

If the button 15 is pressed for several seconds (such as 3 seconds), the GPS wristwatch 1 executes a reception process to receive satellite signals.

Note that this embodiment of the invention can execute a manual reception process that receives signals when the button 15 is pressed, and an automatic reception process that receives automatically when the power output level (open circuit voltage) of the solar cell 22 is greater than or equal to a specific level.

Figure 2:
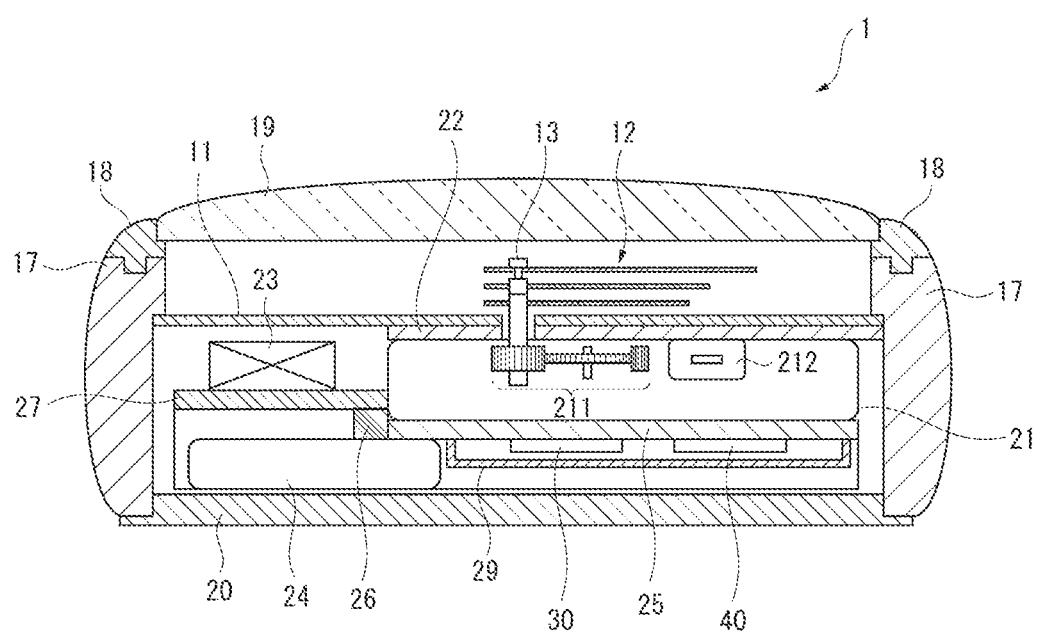
FIG. 2 is a section view of the GPS wristwatch.

As shown in FIG. 2, the GPS wristwatch 1 has an outside case 17 that is made of stainless steel, titanium, or other metal. The outside case 17 is basically cylindrically shaped. A crystal 19 is attached to the opening on the face side of the outside case 17 by an intervening bezel 18. The bezel 18 is made from a non-metallic material such as ceramic in order to improve satellite signal reception performance. A back cover 20 is attached to the opening on the back side of the outside case 17. Inside the outside case 17 are disposed a movement 21, a solar cell 22, a GPS antenna 23, and a storage battery 24.

The movement 21 includes a stepper motor and wheel train 211. The stepper motor has a motor coil 212, a stator and a rotor, and drives the hands 12 through the wheel train 211 and rotating center shaft 13.

A circuit board 25 is disposed on the back cover 20 side of the movement 21. The circuit board 25 is connected through a connector 26 to an antenna circuit board 27 and the storage battery 24.

A GPS receiver circuit 30 including a receiver circuit for processing satellite signals received through the GPS antenna 23, and a control circuit 40 that controls driving the stepper motor, for example, are mounted on the circuit board 25. The GPS receiver circuit 30 and control circuit 40 are covered by a shield plate 29, and are driven by power supplied from the storage battery 24.

The solar cell 22 is a photovoltaic device that converts light energy to electrical energy and outputs power. The solar cell 22 has an electrode for outputting the produced power, and is disposed on the back cover side of the dial 11. Most of the dial 11 is made from a material through which light passes easily, and the solar cell 22 receives and converts light passing through the crystal 19 and dial 11 to electrical power.

The storage battery 24 is the power supply for the GPS wristwatch 1, and stores power produced by the solar cell 22. The two electrodes of the solar cell 22 and the two electrodes of the storage battery 24 can be electrically connected in the GPS wristwatch 1, and the storage battery 24 is charged by the photovoltaic power generation of the solar cell 22 when thus electrically connected. Note that this embodiment of the invention uses a lithium ion battery, which is well suited to mobile devices, as the storage battery 24, but the invention is not so limited and lithium polymer batteries or other types of storage batteries, or a storage device other than a storage battery (such as a capacitive device), may be used instead.

The GPS antenna 23 is an antenna that can receive microwaves in the 1.5 GHz band, and is mounted on the antenna circuit board 27 located on the back cover 20 side of the dial 11. The part of the dial 11 overlapping the GPS antenna 23 in the direction perpendicular to the dial 11 is made from a material through which 1.5-GHz microwave signals pass easily (such as a non-metallic material with low conductivity and low magnetic permeability). The solar cell 22 with electrodes does not intervene between the GPS antenna 23 and the dial 11. The GPS antenna 23 can therefore receive satellite signals passing through the crystal 19 and the dial 11.

The closer the distance between the GPS antenna 23 and the solar cell 22, loss can result from electrical connection between metal components of the GPS antenna 23 and the solar cell 22, and the radiation pattern of the GPS antenna 23 may be blocked by the solar cell 22 and become smaller. The GPS antenna 23 and solar cell 22 are therefore disposed with at least a specific distance therebetween in this embodiment of the invention to prevent a drop in reception performance.

The GPS antenna 23 is also disposed with at least a specific distance to metal parts other than the solar cell 22. For example, if the outside case 17 and movement 21 contain metal parts, the GPS antenna 23 is disposed so that the distance to the outside case 17 and the distance to the movement 21 is at least this specific distance. Note that a patch antenna (microstrip antenna), helical antenna, chip antenna, or inverted F-type antenna, for example, could be used as the GPS antenna 23.

The GPS receiver circuit 30 is a load that is driven by power stored in the storage battery 24, attempts to receive satellite signals from the GPS satellites through the GPS antenna 23 each time the GPS receiver circuit 30 is driven, sends the acquired orbit information, GPS time information, and other information to the control circuit 40 when reception succeeds, and sends a failure report to the control circuit 40 when reception fails.

Figure 3:
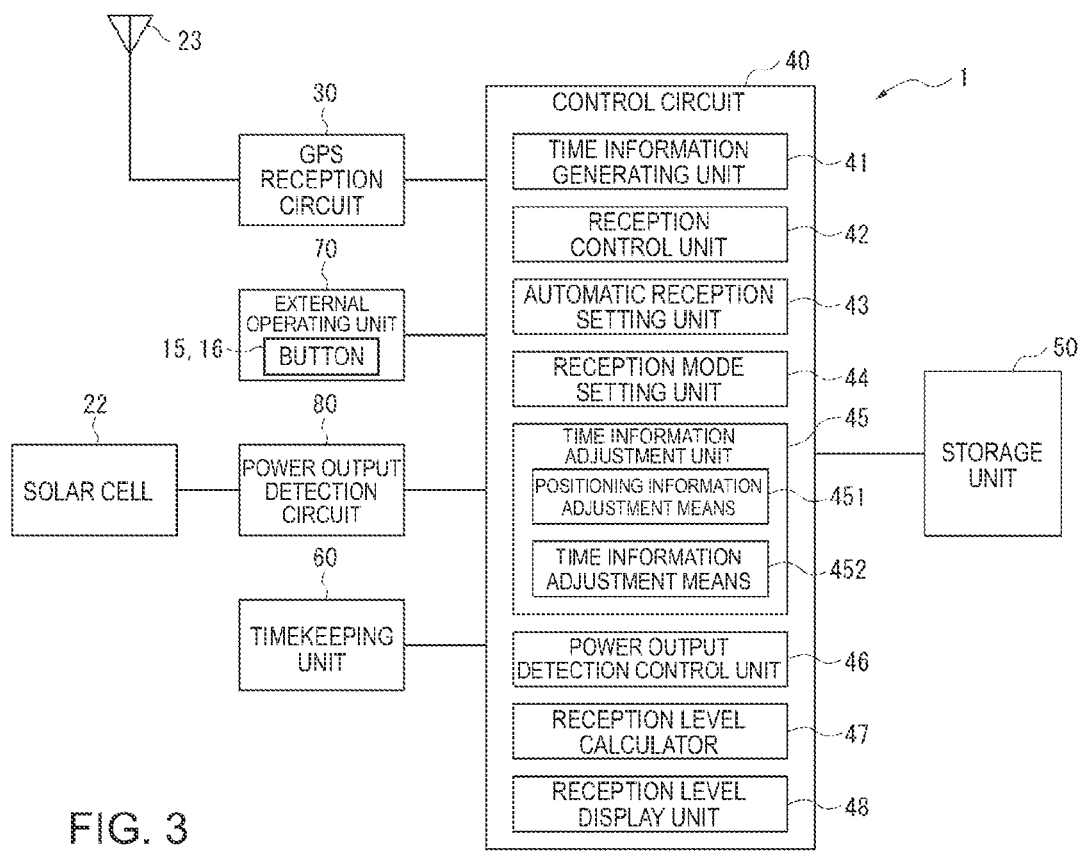
FIG. 3 is a block diagram showing the circuit configuration of the GPS wristwatch.

FIG. 3 is a block diagram showing the circuit configuration of the GPS wristwatch 1. As shown in this figure, the GPS wristwatch 1 has a solar cell 22, a GPS antenna 23, GPS reception circuit 30 as a receiver circuit, control circuit 40, storage unit 50, timekeeping unit 60, external operating unit 70, and power output detection circuit 80.

While not shown in the figures, the main parts of the GPS reception circuit 30 include an RF (radio frequency) unit and GPS signal processor. The RF unit and GPS signal processor perform a process that acquires satellite information such as orbit information and the GPS time contained in the navigation message decoded from a 1.5 GHz satellite signal.

The RF unit is a common component of a GPS receiver having a down-converter that converts high frequency signals to intermediate frequency band signals, and an A/D converter that converts these IF band analog signals to digital signals.

Although not shown in the figures, the GPS signal processor includes a DSP (digital signal processor), CPU (central processing unit), SRAM (static random access memory), and RTC (real-time clock), and runs a process that decodes the navigation message from the digital signal (IF signal) output from the RF unit, and acquires satellite information such as the GPS time and orbit information contained in the navigation message.

The GPS antenna 23 and GPS reception circuit 30 in this embodiment of the invention thus render a reception unit that receives satellite signals transmitted from GPS satellites.

The control circuit 40 is rendered with a CPU for controlling the GPS wristwatch 1. As described below, the control circuit 40 controls the GPS reception circuit 30 and executes a reception process. The control circuit 40 also controls operation of the timekeeping unit 60.

As shown in FIG. 3, the control circuit 40 has a time information generating unit 41, reception control unit 42, an automatic reception setting unit 43, a reception mode setting unit 44, a time information adjustment unit 45, a power output detection control unit 46, a reception level calculator 47, and a reception level display unit 48.

Figure 4:
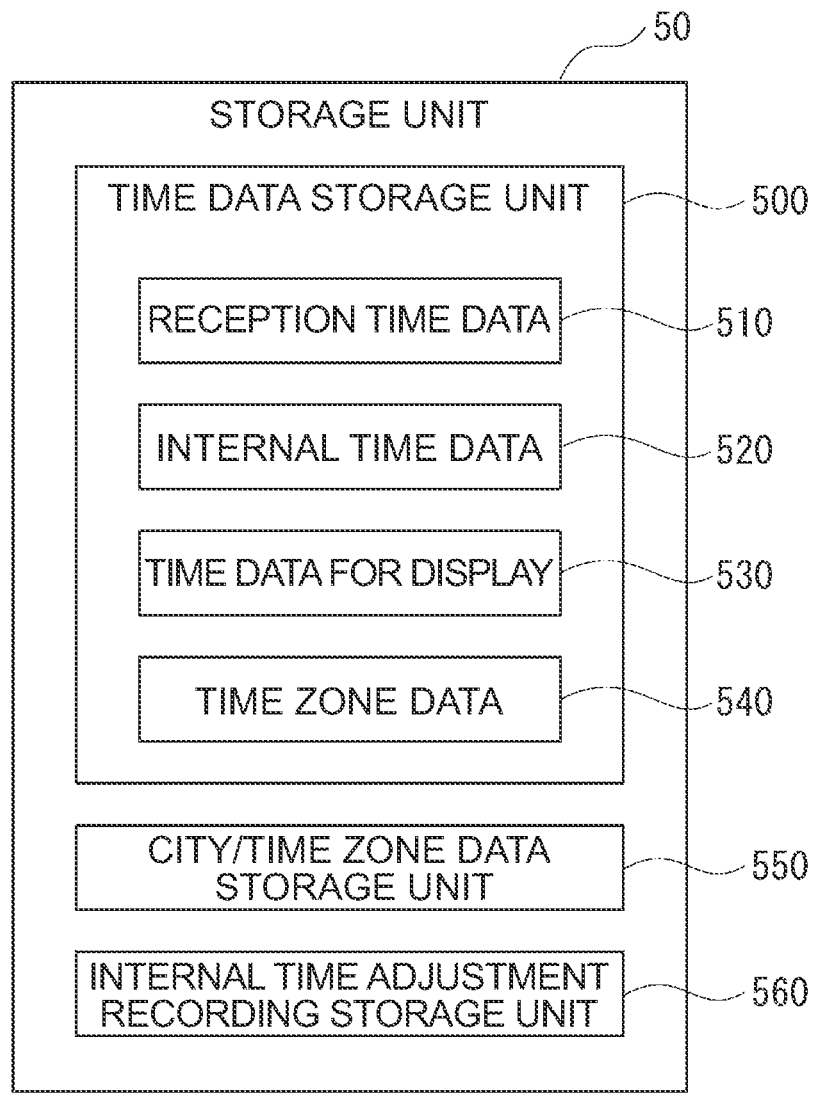
FIG. 4 is a block diagram showing the configuration of the storage unit of the GPS wristwatch.

As shown in FIG. 4, the storage unit 50 has a time data storage unit 500 and a city/time zone data storage unit 550.

The control circuit 40 and storage unit 50 are described further below.

The timekeeping unit 60 includes the hands 12 and a motor that drives the hands 12.

The external operating unit 70 includes a crown 14, button 15, and button 16. A signal that changes the reception mode to the timekeeping mode, positioning mode, or automatic reception OFF mode when button 16 is operated is input to the automatic reception setting unit 43 of the control circuit 40. A signal that starts reception is input to the reception control unit 42 of the control circuit 40 when button 15 is operated.

The power output detection circuit 80 detects the power output (output voltage) of the solar cell 22, and outputs the detected value to the power output detection control unit 46 of the control circuit 40.

Storage Unit Configuration

The storage unit 50 stores time data (satellite time information) acquired by the GPS reception circuit 30.

Reception time data 510, internal time data 520, time data for display 530, and time zone data 540 are stored in the time data storage unit 500.

Satellite time information (GPS time) acquired from a satellite signal is stored as the reception time data 510. This reception time data is normally updated based on a reference signal generated by the time information generating unit 41, and is adjusted according to the acquired satellite time information (GPS time) when a satellite signal is received.

The internal time is stored in the internal time data 520. The internal time is updated based on the GPS time stored in the reception time data 510. More specifically, UTC (Universal Coordinated Time) is stored as the internal time data 520. This internal time information is also updated when the reception time data 510 is updated by the reference signal generated by the time information generating unit 41.

The time obtained by applying the time zone information stored from the time zone data 540 to the internal time information in the internal time data 520 is stored as the time data for display 530. The time zone data 540 stores the set time zone.

The city/time zone data storage unit 550 stores time zone data for individual cities with the time zone data linked to the city names. More specifically, when the user selects the name of a city to find the current time in that city, the control circuit 40 searches the city/time zone data storage unit 550 for the city name selected by the user, and acquires the time zone of that city. For example, because JST is nine hours ahead of UTC (UTC+9), +9 hours is stored in the time zone data 540 when Tokyo is selected.

The internal time adjustment recording storage unit 560 stores satellite time information from the reception time data 510, the internal time information in the internal time data 520 that is updated in conjunction with the reception time data 510, a first reception result record that indicates whether or not reception succeeded in the positioning mode, and a second reception result record that indicates whether or not reception was successful in the timekeeping mode.

Control Circuit Configuration

The configuration of the control circuit 40 is described next.

The time information generating unit 41 counts a reference signal generated by a crystal oscillator or oscillation circuit not shown, and updates the reception time data 510 and internal time data 520.

The reception control unit 42 controls the GPS reception circuit 30 and runs the GPS signal reception process.

The automatic reception setting unit 43 sets the timekeeping mode, positioning mode, or automatic reception OFF mode as selected by operating the button 16.

If the power output detection control unit 46 detects power output exceeded a threshold value other than when the automatic reception OFF mode is set, the reception process is executed automatically in the set mode (timekeeping or positioning) in this embodiment of the invention. However, the number of times the automatic reception process executes is limited to, for example, once a day. This is to prevent the reception process from lowering the battery voltage.

Note that the automatic reception process could execute the reception process in a mode scheduled for a preset time.

The reception mode setting unit 44 can set the reception mode to either the timekeeping mode or the positioning mode. The reception process is executed in the set mode at the automatic reception time and when the button 15 to start reception manually is pressed.

The time information adjustment unit 45 adjusts the reception time data 510 and the internal time data 520 based on the location information and time information in the received GPS signal, and includes a positioning information adjustment means 451 and a time information adjustment means 452.

The positioning information adjustment means 451 controls the GPS reception circuit 30 in the positioning mode through the reception control unit 42, and adjusts the reception time data 510 based on the received positioning information and time information. More specifically, the positioning information adjustment means 451 references the city/time zone data storage unit 550 using the positioning information, and adjusts the time zone data 540. The reception time data 510 is then adjusted using the time information. The internal time data 520 is also adjusted at the same time using the reception time data 510.

The time information adjustment means 452 controls the GPS reception circuit 30 in the timekeeping mode through the reception control unit 42, and adjusts the reception time data 510 based on the time information contained in the GPS signal. More specifically, the reception time data 510 is adjusted using this time information. The internal time data 520 is also simultaneously adjusted using the reception time data 510.

The power output detection control unit 46 runs a process to operate the power output detection circuit 80 to detect the output power (output voltage) from the solar cell 22, and acquire the detection value from the power output detection circuit 80. Whether to start the automatic reception process is determined from the result.

The reception level calculator 47 executes a process that calculates the reception level from the signal strength of the received satellite signal as described below.

The reception level display unit 48 executes a process to display the reception level calculated by the reception level calculator 47 using the second hand 121 as described below.

Note that the reception process may also be started when the timekeeping mode or positioning mode is set and a preset scheduled time is reached.

The threshold value compared with the power output is suitably set to enable determining whether or not the electronic timepiece is outdoors. For example, the illuminance of light striking the solar cell 22 under fluorescent lights is normally 500 to 1000 lux, and the illuminance of light striking the solar cell 22 indirect sunlight exceeds 10,000 lux. Power output corresponding to light of 10,000 lux incident to the solar cell 22 is therefore set as the threshold value.

When the reception process is executed, the reception control unit 42 of the control circuit 40 controls the GPS reception circuit 30 and starts the reception process (S1). The GPS reception circuit 30 then starts the satellite search process (S2).

Next, the reception level calculator 47 determines if the reception mode set by the reception mode setting unit 44 is the positioning mode (S3).

If the positioning mode is set (S3 returns Yes), the reception level calculator 47 selects the four satellite signals with the highest signal strength (S4). If the timekeeping mode is set (S3 returns No), the reception level calculator 47 selects the one satellite signal with the highest signal strength (S5). Note that signal strength in this embodiment of the invention is based on the SNR value.

The reception level calculator 47 calculates the reception level from the signal strength of the selected satellite signals (S6). A specific example of how this reception level is calculated is described with reference to Table 1. Note that the GPS reception circuit 30 in this embodiment has an 8-channel receiver circuit so that eight satellite signals can be simultaneously locked onto and received.

TABLE 1

| | Signal strength | | |
| --- | --- | --- | --- |
| Satellite No. | Case 1 | Case 2 | Case 3 |
| 1 | 43 | 45 | 45 |
| 2 | 42 | 45 | 45 |
| 3 | 41 | 45 | 45 |
| 4 | 40 | 45 | 0 |
| 5 | 35 | 30 | 0 |
| 6 | 34 | 30 | 0 |
| 7 | 31 | 30 | 0 |
| 8 | 30 | 30 | 0 |

| Reception level | TIME-KEEPING | POSI-TIONING | TIME-KEEPING | POSI-TIONING | TIME-KEEPING | POSI-TIONING |
| --- | --- | --- | --- | --- | --- | --- |
| Embodiment 1 | 43 | 42 | 45 | 45 | 45 | 34 |
| Comparison: simple avg. | | 37 | | 38 | | 17 |

Control Circuit Operation

The operation of the control circuit 40 in the GPS wristwatch 1 is described next with reference to the flow chart in FIG. 5.

Figure 5:
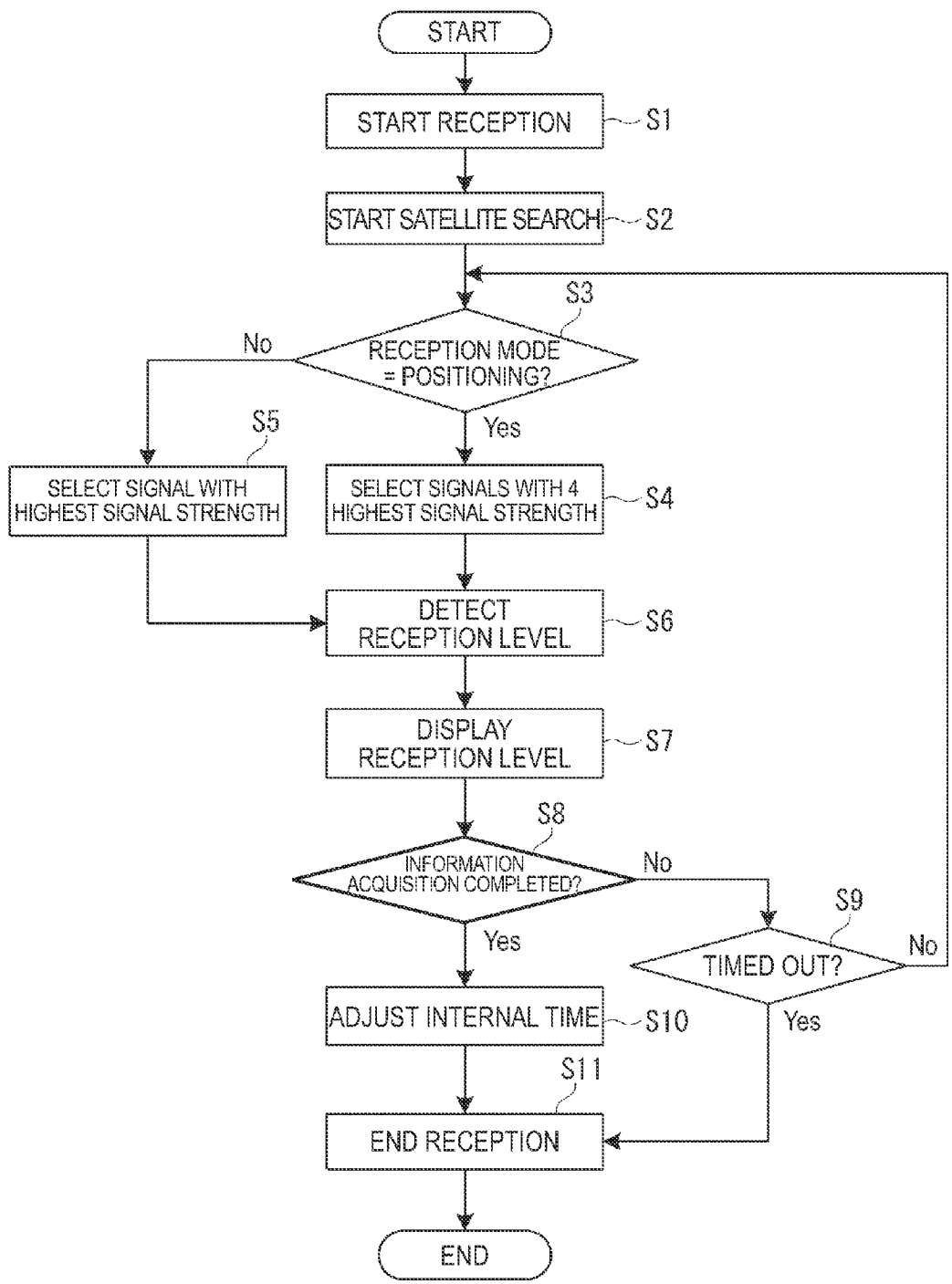
FIG. 5 is a flow chart of a time adjustment process in a first embodiment of the invention.

The GPS wristwatch 1 starts the reception process shown in FIG. 5 when: (i) when the timekeeping mode or positioning mode is set by the button 16, and a command to start the manual reception process is asserted by the user pressing button 15 for plural seconds or longer, and (ii) when the timekeeping mode or positioning mode is set by the button 16, and the power output detected by the power output detection circuit 80 is greater than or equal to a threshold value.

As shown in Table 1, eight satellite signals were received in cases 1 and 2, and sorted in descending order by signal strength. Only three satellite signals were received in case 3.

When the reception mode is set to the timekeeping mode, the reception level calculator 47 selects the one satellite signal with the highest signal strength (S5), and calculates that signal strength as the reception level (S6). As a result, the reception level in case 1 is 43, in case 2 is 45, and in case 3 is 45.

When the reception mode is set to the positioning mode, the reception level calculator 47 selects the four satellite signals with the highest signal strengths (S4), and calculates the average of those signal strengths as the reception level (S6). As a result, the reception level in case 1 is (43+42+41+40)/4=41.5, which is rounded to 42. Note that this embodiment rounds the decimal portion of the calculated signal strength. The reception level in case 2 is therefore 45, and in case 3 is (45+45+45+0)/4=33.75, which is rounded to 34.

Figure 6C:
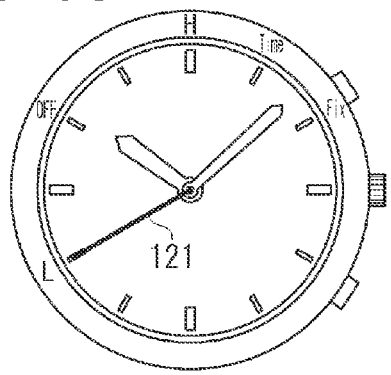
Figure 6D:
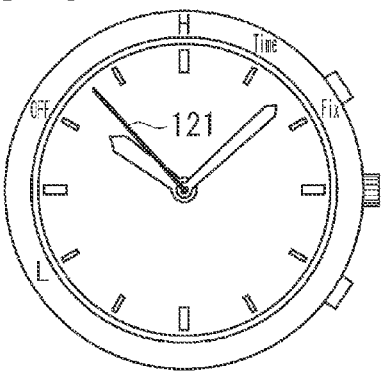
Figure 6E:
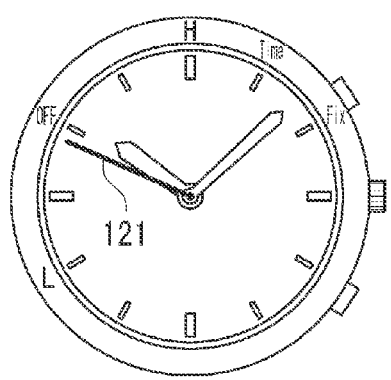
Figure 6F:
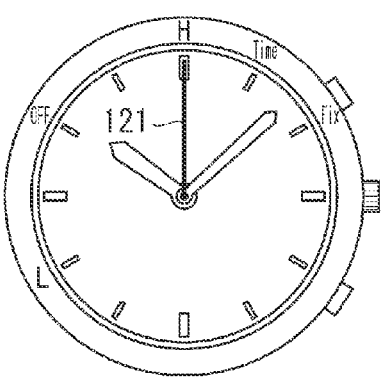

The reception level display unit 48 then displays the calculated reception level with the second hand 121 (S7). When the reception level is 30 or less, the signal strength is unsuitable for reception (signal strength is LOW), and the reception level display unit 48 therefore moves the second hand 121 to the 40-second position as shown in FIG. 6C. If the reception level is 50 or higher, the reception level display unit 48 moves the second hand 121 to the 0-second position as shown in FIG. 6F.

If the reception level is between 30 and 50, the second hand goes to the position at the value of the reception level plus 10. For example, if the reception level is 43, the reception level display unit 48 moves the second hand 121 to the 53-second position as shown in FIG. 6D, and if the reception level is 39, moves the second hand 121 to the 49-second position as shown in FIG. 6E.

The reception level calculator 47 then determines if information acquisition is completed (S8), and if acquisition is not completed (S8 returns No), determines if operation has timed out (S9).

The timeout detection step S9 is provided because the possibility of being able to acquire information by continuing reception when the time information or positioning information could not be acquired and a timeout period has passed is low, and reception is therefore terminated to reduce power consumption.

This timeout period is set according to the reception mode. More specifically, the signal reception process and decoding process take more time in the positioning mode than the timekeeping mode, and a longer time is therefore set. For example, the timeout period is set as the time from when reception starts until when reception is completed, the timeout period in the timekeeping mode is set in the range of 20-60 seconds, and the timeout period in the positioning mode is set in the range from 60-180 seconds, for example.

If S9 returns No, the reception level calculator 47 and reception level display unit 48 repeat steps S3 to S7. More specifically, the reception level calculator 47 acquires signal strength data at 1-second intervals from the GPS reception circuit 30, and calculates and displays the reception level. The reception level display unit 48 therefore moves the second hand 121 every 1 second during reception and displays the reception level in real time.

The second hand 121 thus moves in the range from the 40-second to 0-second position at this time, signal strength increases as the 0-second position is approached, and the user knows that the probability of being able to acquire information is also higher.

If acquisition of information is completed and S8 returns Yes, the time information adjustment unit 45 adjusts the internal time based on the received information (S10), and then ends reception (S11).

If the timeout period passes and S9 returns Yes, reception ends (S11) without adjusting the internal time.

When time information acquisition ends in the timekeeping mode, the time information adjustment means 452 adjusts the reception time data 510 based on the time information received by the GPS reception circuit 30, and adjusts the internal time data 520 using this reception time data 510 (S10). The time data for display 530 is also adjusted based on the internal time data 520 and time zone data 540.

The timekeeping unit 60 then drives the hands 12 to display the time denoted by the time data for display 530. The time adjustment process then ends.

When positioning information and time information acquisition ends in the positioning mode, the positioning information adjustment means 451 references the city/time zone data storage unit 550, identifies the time difference to UTC based on the positioning information received by the GPS reception circuit 30, and adjusts the time zone data 540. The positioning information adjustment means 451 then adjusts the reception time data 510 based on the time information received by the GPS reception circuit 30, and adjusts the internal time data 520 using this reception time data 510. The time data for display 530 is also adjusted based on the internal time data 520 and time zone data 540. The timekeeping unit 60 then drives the hands 12 to display the time denoted by the time data for display 530. The time adjustment process then ends.

Operating Effect of the Electronic Timepiece

The effect of this embodiment of the invention is described next.

The reception level calculator 47 selects a specific number of satellite signals according to the reception mode in order of the highest signal strength, and calculates the average signal strength of the selected satellite signals as the reception level.

Because the number of satellite signals (specific number) used to calculate the reception level is set separately for the timekeeping mode and the positioning mode, this embodiment of the invention can appropriately display the reception condition for acquiring the necessary information in the timekeeping mode and positioning mode.

For example, for the comparison shown in Table 1, the average signal strength of all 8 channels is calculated, resulting in 37 for case 1, 38 for case 2, and 17 for case 3. Comparing these comparison values (simple averages) with the reception level determined by the method of this embodiment, the reception level is higher in these embodiments in each of cases 1 to 3. Considering that the necessary information can be acquired by receiving one satellite signal in the timekeeping mode and four signals in the positioning mode, the reception level determined by the invention can more accurately display the probability of reception.

More particularly, the statistical results of measurement tests have shown that the possibility of being able to also receive a fourth satellite signal by continuing reception is high when three satellite signals with a relatively high signal strength are received as shown in case 3 in Table 1. More specifically, when three satellite signals have been received, the GPS wristwatch 1 is outdoors in a good reception environment, the location of the fourth GPS satellite simply happens to be hidden by a building, for example, and the possibility of receiving the fourth signal over time is high when the GPS wristwatch 1 or the GPS satellite moves.

However, when these three satellite signals are received, the electronic timepiece described in JP-A-2009-180555 displays the same reception level, level 0, as when not even one signal is received. As a result, reception is often interrupted even though the positioning information could actually be acquired by continuing reception a little longer, and the probability of the reception process being wasted as a result is high.

In contrast, when three satellite signals with high signal strength are received, the reception level is higher than when even one satellite signal cannot be received, and this embodiment of the invention calculates a reception level corresponding to the probability of reception. As a result, the user does not interrupt reception, the possibility of being able to receive the fourth satellite signal and acquire positioning information increases, and interrupting reception without acquiring the positioning information can be prevented.

In addition, the reception level can also be determined with greater precision because the average signal strength of the specific number of satellite signals is calculated as the reception level. As a result, the reception level can be calculated and displayed more precisely compared with displaying the reception level in three levels as described in JP-A-2009-180555. As a result, the user can correctly determine the reception level, can interrupt reception or move to a location with better reception based on the displayed level, and can choose to take appropriate action. Wasting power by failed reception can therefore be reduced, the duration time can be increased in wristwatches and other portable electronic timepieces, and convenience can be improved.

In addition to a manual reception process that operates the GPS reception circuit 30 when the button 15 is pressed, this embodiment can also set an automatic reception process that automatically operates the GPS reception circuit 30 when the power output of the solar cell 22 is greater than or equal to a preset threshold value. Because the GPS reception circuit 30 thus operates automatically conditionally upon the power output of the solar cell 22 reaching a threshold value, the GPS reception circuit 30 can be operated when the GPS reception circuit 30 is in an environment where satellite signals can be easily received, such as outdoors.

Furthermore, because the reception level calculator 47 calculates the reception level at 1-second intervals during reception, the user can know the reception level in real time. The user can therefore take appropriate action, such as moving to a place where reception is easier, while seeing the actual reception level. Detecting a location with a good reception environment is therefore relatively simple.

Because the reception level is displayed using the second hand 121, a special mechanism or display, for example, for displaying the reception level is not needed. The parts count and cost of the GPS wristwatch 1 can therefore be reduced, the timepiece can be designed with a simple appearance, and the aesthetic appeal can be improved.

In addition, because the reception level is displayed using the second hand 121, the reception level can be displayed in real time with good response.

Embodiment 2

A second embodiment of the invention is described next with reference to the accompanying figures.

Note that this second embodiment differs from the first only in the method of calculating the reception level by the reception level calculator 47. The structure and flow of the process executed by the GPS wristwatch 1 are therefore the same as in the first embodiment, and detailed description thereof is omitted.

When one or more and less than a specific number of satellite signals are received, the reception level calculator 47 according to the second embodiment of the invention sets the signal strength of the missing satellite signal to a preset provisional signal strength to calculate the reception level.

Note that the process of this second embodiment is conditional upon receiving one or more satellite signals. As a result, in the timekeeping mode where the specific number is already 1, a state in which the number of received satellite signals is less than the specific number will not occur. The process of this second embodiment is therefore applied when the positioning mode is set and the number of satellite signals received is 1 to 3. Table 2 shows a specific example of the method of calculating the reception level in this second embodiment.

TABLE 2

| Satellite No. | Signal strength | | |
|---|---|---|---|
| | Case 2-1 | Case 2-2 | Case 2-3 |
| 1 | 45 | 45 | 45 |
| 2 | 45 | 45 | 0 (12) |
| 3 | 45 | 0 (16) | 0 (12) |
| 4 | 0 (20) | 0 (16) | 0 (12) |
| 5 | 0 | 0 | 0 |
| 6 | 0 | 0 | 0 |
| 7 | 0 | 0 | 0 |
| 8 | 0 | 0 | 0 |

| Reception Level | Time-keeping | Positioning | Time-keeping | Positioning | Time-keeping | Positioning |
|---|---|---|---|---|---|---|
| Embodiment 2 | 45 | 39 | 45 | 31 | 45 | 20 |
| Embodiment 1 | 45 | 34 | 45 | 23 | 45 | 11 |

The provisional signal strength of the missing satellite signal is selected from among 20, 16, and 12 to calculate the reception level in this second embodiment.

More specifically, as shown in case 2-1 in Table 2, when the number of received signals is 3 in the positioning mode, for which the specific number of satellite signals to receive is 4, the signal strength of the missing signal, that is, the satellite signal that has not been received, is set to 20 as shown in parentheses in Table 2. As a result, the reception level calculator 47 calculates the reception level to be (45+45+45+20)/4=38.75, which is rounded to 39, in case 2-1.

Furthermore, because only two satellite signals are received in case 2-2, 16 is used as the signal strength of the two missing satellite signals to calculate the reception level, resulting in a reception level of 31. Because only one satellite signal is received in case 2-3, 12 is used as the signal strength of the remaining three signals, and the reception level is calculated to be 20.

The provisional signal strength decreases as the number of missing satellite signals increases to reflect the likelihood of being able to actually receive the satellite signals that have not been received if reception is continued. More specifically, when three satellite signals have been received and there is one remaining signal to receive, the probability of being able to receive the remaining satellite signal is high if reception is continued. As a result, the provisional signal strength is also set to 20, which is relatively high compared with a signal strength of 0 when a signal is not received.

As the number of missing satellite signals increases to 2 or 3, the probability that these satellite signals can be received also drops. As a result, the provisional signal strength is set to 16 when the number of missing satellites is 2, and to 16 when the number missing is 3.

The reception level display unit 48 then displays the reception level calculated by the reception level calculator 47 using the second hand 121.

Note that the provisional signal strength changes according to the number of missing satellites in this second embodiment, but could be set to the same value. In addition, the provisional signal strength is not limited to a fixed value, and could be set referenced to the signal strength of the received satellite signals. For example, if the average signal strength is 45 when three satellite signals are received, the value of 50% of the average, or 23 in this case, could be set as the provisional signal strength.

This second embodiment of the invention has the same effect as the first embodiment described above.

In addition, as shown in Table 2, the reception level drops significantly in the first embodiment when the number of satellite signals received in the positioning mode is 3 or less. As a result, depending on the user, this creates the impression that continuing reception is difficult, and could result in reception being interrupted.

However, because the provisional signal strength of the satellite signal that could not be received is complemented with a setting of 20, this second embodiment can display a higher reception level than the positioning mode in the first embodiment. Particularly when three or two satellite signals are received, this enables calculating and displaying a reception level that better matches the likelihood of being able to acquire positioning information by continuing reception. Users looking at the reception level display will therefore more likely continue reception, and the probability of acquiring positioning information can also be improved.

Embodiment 3

A third embodiment of the invention is described next with reference to the accompanying figures.

This third embodiment of the invention complements the signal strength of the missing number of specified satellite signals with a specific value in the same way as the second embodiment, but differs by changing (reducing) this setting as the reception time increases. This difference is described below.

When one or more and less than a specific number of satellite signals have been received, the reception level calculator 47 in this third embodiment of the invention calculates the reception level using a preset value as the provisional signal strength of the missing satellite signals. This provisional signal strength is set to 20 when reception starts, and the provisional signal strength is reduced in steps over time. More specifically, as shown in Table 3, the provisional signal strength is reduced to 15 after 5 seconds, 10 after 10 seconds, 5 after 15 seconds, and 0 after 20 seconds.

TABLE 3

| Satellite No. | Time passed | | | | |
|---|---|---|---|---|---|
| | Start | 5 sec | 10 sec | 15 sec | 20 sec |
| 1 | 45 | 45 | 45 | 45 | 45 |
| 2 | 45 | 45 | 45 | 45 | 45 |
| 3 | 45 | 45 | 45 | 45 | 45 |
| 4 | 0 (20) | 0 (15) | 0 (10) | 0 (5) | 0 (0) |
| 5 | 0 | 0 | 0 | 0 | 0 |
| 6 | 0 | 0 | 0 | 0 | 0 |
| 7 | 0 | 0 | 0 | 0 | 0 |
| 8 | 0 | 0 | 0 | 0 | 0 |

TABLE 3-continued

| Satellite No. | Time passed | | | | |
|---|---|---|---|---|---|
| | Start | 5 sec | 10 sec | 15 sec | 20 sec |
| Reception level during positioning | 39 | 38 | 36 | 35 | 34 |

As shown in Table 3, the reception level calculator 47 in this third embodiment changes the provisional signal strength of the missing specific number of satellite signals with the time elapsed since the start of reception. This embodiment reduces the setting in 5 stages in 5-second increments.

The reception level calculated by the reception level calculator 47 therefore drops every 5 seconds if the other three signal strengths do not change. Actual test measurements showed that because the probability that information can be acquired decreases as the time during which the missing satellite signal cannot be received increases, the actual state of reception in the positioning mode can be approximated if the reception level is set to change with the passage of time. As a result, the reception level can be more appropriately displayed for the user.

Embodiment 4

A fourth embodiment of the invention is described next with reference to the accompanying figures.

When the reception level calculator 47 calculates the reception level, this fourth embodiment of the invention differs from the preceding embodiments by correcting by increasing the signal strength by a specific percentage when the signal strength of the received satellite signal is greater than or equal to a first threshold value, correcting by decreasing the signal strength by a specific percentage when the signal strength of the received satellite signal is less than a second threshold value (which is lower than the first threshold value), and calculating the reception level using the corrected signal strength.

When the signal strength of the received satellite signal is less than the first threshold value and greater than or equal to the second threshold value, the reception level calculator 47 calculates the reception level without changing the signal strength.

More specifically, when the signal strength is greater than or equal to 40, which is the first threshold value, the reception level calculator 47 increases and corrects the detected signal strength 10%. When the signal strength is less than 35, which is the second threshold value, the reception level calculator 47 decreases and corrects the detected signal strength 10%. When the signal strength is from 35-39 (first threshold to second threshold), the reception level calculator 47 uses the detected signal strength without correction.

The reception level calculator 47 then calculates the reception level using the corrected value. Sample calculations are shown in Table 4.

TABLE 4

| | | Signal strength | | | | | | | | | |
|---|---|---|---|---|---|---|---|---|---|---|---|
| | | Case 4-1 | | Case 4-2 | | Case 4-3 | | Case 4-4 | | Case 4-5 | |
| | | Actual | Corrected | Actual | Corrected | Actual | Corrected | Actual | Corrected | Actual | Corrected |
| Satellite No. | 1 | 43 | 47 | 45 | 50 | 45 | 50 | 36 | 36 | 34 | 31 |
| | 2 | 42 | 46 | 45 | 50 | 45 | 50 | 36 | 36 | 33 | 30 |
| | 3 | 41 | 45 | 45 | 50 | 45 | 50 | 35 | 35 | 32 | 29 |
| | 4 | 40 | 44 | 45 | 50 | 0 | 0 | 35 | 35 | 31 | 28 |
| | 5 | 35 | 35 | 30 | 27 | 0 | 0 | 0 | 0 | 0 | 0 |

TABLE 4-continued

|  |  | Signal strength | | | | | | | | |
|---|---|---|---|---|---|---|---|---|---|---|
|  |  | Case 4-1 | | Case 4-2 | | Case 4-3 | | Case 4-4 | | Case 4-5 | |
|  |  | Actual | Corrected | Actual | Corrected | Actual | Corrected | Actual | Corrected | Actual | Corrected |
|  | 6 | 34 | 31 | 30 | 27 | 0 | 0 | 0 | 0 | 0 | 0 |
|  | 7 | 31 | 28 | 30 | 27 | 0 | 0 | 0 | 0 | 0 | 0 |
|  | 8 | 30 | 27 | 30 | 27 | 0 | 0 | 0 | 0 | 0 | 0 |
| Reception | Simple avg. | 37 | | 38 | | 17 | | 18 | | 16 | |
| level during | Embodiment 1 | 42 | | 45 | | 34 | | 36 | | 33 | |
| positioning | Embodiment 4 | 46 | | 50 | | 38 | | 36 | | 30 | |

In Table 4 the simple averages are the average of actual measurements for satellites 1 to 8. Embodiment 1 shows the average of the top four actual measurements for satellites 1 to 8. Embodiment 4 shows the average of the top four corrected values for satellites 1 to 8. Note that the decimal part of all averages is also rounded.

As shown in Table 4, when the signal strength is high, meaning that the possibility of acquiring the positioning information is high (cases 4-1, 4-2, 4-3), the fourth embodiment can calculate a higher reception level than the first embodiment. When the signal strength is low, indicating the possibility of acquiring positioning information is low (case 4-5), the fourth embodiment also calculates a lower reception level.

Note also that in case 4-4 the actual readings are in the range 35-39 and are not corrected, and the first and fourth embodiments therefore calculate the same reception level.

This fourth embodiment of the invention can correct the reception level to a higher level when the signal strength exceeds a first threshold, can correct the reception level to a lower level when the signal strength is less than a second threshold, can therefore emphasize the displayed reception level so that the reception level is shown even higher when the likelihood of acquiring information is high, and is shown even lower when the likelihood is low, and can therefore display whether or not conditions enable receiving information in a more readily understandable way for the use.

Other Embodiments

The invention is not limited to the foregoing embodiments and can be varied in many ways without departing from the scope of the accompanying claims.

For example, first and second (two) threshold values are set in the fourth embodiment to correct the signal strength when greater than the first threshold or less than the second, but three or more threshold values could be set. When three or more threshold values are set, the signal strength correction rate differs according to each threshold value. For example, if first to fourth signal strength threshold values of 45, 40, 35, 30 are set and the detected signal strength is greater than or equal to the first threshold value (45), the detected signal strength is corrected and increased 20%; if less than threshold 1 and greater than or equal to threshold 2 (40), the detected signal strength is corrected and increased 10%; if less than threshold 2 and greater than or equal to threshold 3 (35), the detected signal strength is left unchanged; if less than threshold 3 and greater than or equal to threshold 4 (30), the detected signal strength is corrected and decreased 10%; and if less than threshold 4, the detected signal strength is corrected and decreased 20%. The reception level is then calculated using the corrected signal strength.

Displaying the reception level is also not limited to moving the second hand 121, and the reception level could be displayed by moving the minute hand 122. More particularly, in a two-hand timepiece having only an hour hand 123 and minute hand 122 and not having a second hand 121, the minute hand 122 is preferably moved to display (show) the reception level or reception result.

The method of displaying the reception level is also not limited to physically driving a hand, for example. More particularly, a reception state display device such as an LCD panel could be disposed to the GPS wristwatch 1, and the reception level could be displayed on this reception state display device.

The specific number used in the positioning mode is 4 in the foregoing embodiments, but could be 3 if coarse positioning is acceptable. In addition, while the specific number is normally set to 4 in the positioning mode, 5 or a greater value could be used instead.

Likewise, the specific number is 1 in the timekeeping mode, but a value of 2 or greater could be used instead.

The second, third, and fourth embodiments could also be combined. More specifically, after setting a provisional signal strength when the number of satellite signals received is less than the specific number, the signal strength cold be corrected by comparison with the first and second threshold values, and the reception level then calculated.

The location of the GPS antenna 23 is also not limited to the foregoing embodiments. More specifically, because the secondhand 121 is relatively thin, the possibility of being able to receive satellite signals is also high if the signal level is relatively high even if the second hand 121 and the GPS antenna 23 overlap in plan view. However, the configuration of the foregoing embodiments is preferable because reception performance can be further improved.

Positioning information is not displayed in the foregoing embodiments, but a display could be provided to display the information, or a dedicated hand could be provided. For example, a display or other display device could be provided to display the positioning information (latitude and longitude).

The foregoing embodiments are described with reference to a GPS satellite as an example of a positioning information satellite, but the positioning information satellite of the invention is not limited to GPS satellites and the invention can be used with Global Navigation Satellite Systems (GNSS) such as Galileo (EU), GLONASS (Russia), and Beidou (China), and other positioning information satellites that transmit satellite signals containing time information, including the SBAS and other geostationary or quasi-zenith satellites.

An electronic timepiece according to the invention is not limited to wristwatches, and the invention can be used in a wide range of devices that are driven by a storage battery and receive satellite signals sent from positioning information satellites, including cellular phones and mobile GPS receivers used for mountain climbing, for example.

The electronic timepiece of the invention is also not limited to a wristwatch 1, and the invention can also be applied to pocket watches and other types of timepieces, as well as cell phones, digital cameras, handheld information terminals, navigation systems, and other devices with an electronic timepiece function built in. Note, further, that the foregoing embodiments have a positioning mode and a timekeeping mode, but only one mode could be provided depending upon the electronic device in which the invention is used.

What is claimed is:

1. An electronic timepiece comprising:
a reception unit configured to receive multiple satellite signals transmitted from multiple positioning information satellites;
a reception level calculating unit that calculates a reception level from the received satellite signals; and
a reception level display unit that displays the reception level calculated by the reception level calculating unit;
wherein the reception level calculating unit:
populates a working set of satellite signals, a populated working set of satellite signals having a fixed prescribed number of satellite signals;
selects as many received satellite signals as available up to the fixed prescribed number to populate the working set of satellite signals, each selected satellite signal being from a different positioning information satellite, and the selected satellite signals having the highest ascribed signal strengths among the received satellite signals; and
calculates the reception level from the ascribed signal strengths of the satellite signals within the populated working set of satellite signals;
wherein:
the reception level calculating unit calculates the reception level as the sum of the ascribed signal strengths of the satellite signals within said working set divided by the fixed prescribed number;
the reception unit is active within a defined satellite reception period; and
the reception level calculating unit updates the working set of satellite signals and calculates correspondingly updated reception levels within the defined satellite reception period.

2. The electronic timepiece of claim 1, wherein the reception level calculating unit repeatedly updates the working set of satellite signals and calculates correspondingly updated reception levels within the defined satellite reception period, and
the reception level display unit updates the display of the adjusted reception level each time the reception level calculating unit updates the reception level.

3. The electronic timepiece of claim 1, further having an operation mode selector for selecting between a timekeeping mode that performs a time adjustment process based on time information acquired from the received satellite signals and a positioning mode that adjusts a time zone setting based on positioning information acquired from the received satellite signals;
wherein the value of the fixed prescribed number is set to a first fixed prescribed number if the timekeeping mode is selected and to a second fixed prescribed number if the positioning mode is selected, the second fixed prescribe number being different than the first fixed prescribed number.

4. The electronic timepiece of claim 3, wherein:
when the timekeeping mode is selected, the value of the fixed prescribed number is set to one, and
the reception level calculating unit selects the one satellite signal having the highest signal strength to calculates the reception level.

5. The electronic timepiece of claim 4, wherein:
when the positioning mode is selected, the value of the fixed prescribed number is set to an integer number greater than three; and
the reception level calculating unit selects the integer number of satellite signals having the highest signal strengths to calculates the reception level.

6. The electronic timepiece of claim 5, wherein said integer number is four.

7. The electronic timepiece of claim 1, further having a first signal strength threshold and a second signal strength threshold lower than said first signal strength threshold, wherein:
if the observed signal strength of a received satellite signal is not lower than the first signal strength threshold, then the reception level calculating unit ascribes to the received satellite signal a signal strength that is a first predefined percentage higher than its observed signal strength;
if the observed signal strength of a received satellite signal is less than the first signal strength threshold and not less than the second signal strength threshold, then the reception level calculating unit ascribes to the received satellite signal its observed signal strength; and
if the observed signal strength of a received satellite signal is lower than the second signal strength threshold, then the reception level calculating unit ascribes to the received satellite signal a signal strength that is a second predefined percentage lower than its observed signal strength.

8. The electronic timepiece of claim 1, further comprising:
a clock face and time-indicating hands, said clock face having a time scale indicating time-laps increments, said time-indicating hands being configured to indicate the passage of time on said time scale;
wherein:
a portion of said time scale is further designated a reception-level scale having a display range with an upper display limit and a lower display limit, the scale increments between the lower display limit and upper display limit of the reception-level scale being the same as the time-laps increments of the time scale;
if the reception level calculated by the reception level calculating unit is not lower than a first value below the upper display limit of the reception-level scale, then a predefined hand among said time-indicating hands is made to point to the upper display limit of the reception-level scale;
if the reception level calculated by the reception level calculating unit is not higher than a second value below the lower display limit of the reception-level scale, then said predefined hand is made to point to the lower display limit of the reception-level scale; and
if the reception level calculated by the reception level calculating unit is between said first value below the upper display limit and said second value below the lower display limit, then the reception level display unit adds a constant numerical offset to the reception level calculated by the reception level calculating unit to define an adjusted reception level and said predefined hand is made to point to the adjusted reception level on the reception-level scale.

9. The electronic timepiece of claim 1, wherein the reception unit receives the multiple satellite signals transmitted from the multiple positioning information satellites simultaneously.

10. An electronic timepiece comprising:
   a reception unit configured to receive multiple satellite signals transmitted from multiple positioning information satellites;
   a reception level calculating unit that calculates a reception level from the received satellite signals; and
   a reception level display unit that displays the reception level calculated by the reception level calculating unit;
   wherein the reception level calculating unit:
      populates a working set of satellite signals, a populated working set of satellite signals having a prescribed number of satellite signals;
      selects as many received satellite signals as available up to the prescribed number to populate the working set of satellite signals, each selected satellite signal being from a different positioning information satellite, and the selected satellite signals having the highest ascribed signal strengths among the received satellite signals; and
      calculates the reception level from the ascribed signal strengths of the satellite signals within the populated working set of satellite signals;
   wherein:
      the reception level calculating unit calculates the reception level as the sum of the ascribed signal strengths of the satellite signals within said working set divided by the prescribed number;
      the reception unit is active within a defined satellite reception period; and
      the reception level calculating unit updates the working set of satellite signals and calculates correspondingly updated reception levels within the defined satellite reception period; and
   wherein when the number of received satellite signals received by the reception unit is less than the prescribed number needed to populate the working set of satellite signals, the reception level calculating unit completes the populating of the working set of satellite signals by adding not-received satellite signals until the prescribed number of satellite signals is reached, and ascribes a provisional signal strength to each not-received satellite signal.

11. The electronic timepiece of claim 10, wherein the reception level calculating unit lowers the provisional signal strength of at least one of said not-received satellite signals if a predefined time interval elapses without the reception unit receiving a new satellite signal transmitted from a new positioning information satellite.

* * * * *